UNITED STATES PATENT OFFICE.

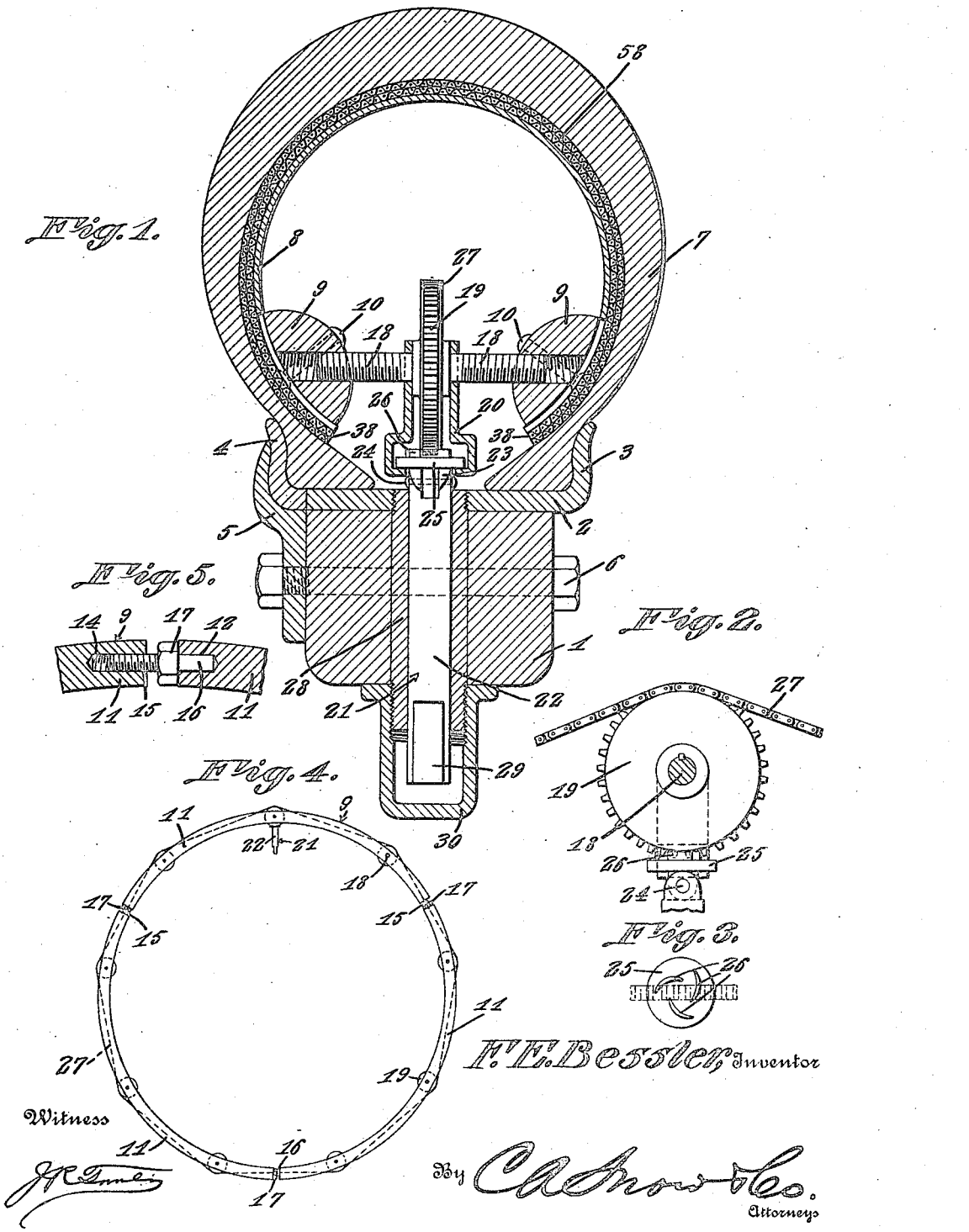

FRANK E. BESSLER, OF AKRON, OHIO.

INNER TUBE.

1,419,443.  Specification of Letters Patent.  Patented June 13, 1922.

Application filed August 15, 1921, Serial No. 492,317. Renewed May 8, 1922. Serial No. 559,423.

*To all whom it may concern:*

Be it known that I, FRANK E. BESSLER, a citizen of the United States, residing at Akron, in the county of Summit and State of Ohio, have invented a new and useful Inner Tube, of which the following is a specification.

The device forming the subject matter of this application is a tire of that general type in which the casing is expanded, not by an inflatable member, but, rather, through the instrumentality of a spring frame which may be expanded transversely, the frame exercising the function of an inner tube.

It is the object of this invention to provide simple means for expanding the frame or inner tube above alluded to.

Within the scope of what is claimed, a mechanic, exercising the skill of his calling, may make changes in the precise structure shown, without departing from the spirit of the invention.

In the accompanying drawings:—

Figure 1 shows in transverse section, a device constructed in accordance with the invention; Figure 2 is a fragmental elevation showing one of the sprocket wheels and attendant parts; Figure 3 is an end elevation disclosing the means whereby motion is transmitted to the sprocket wheel shown in Figure 2; Figure 4 is a side view, diagrammatic in nature, and showing one of the rings which are connected to the spring frame or inner tube, adjacent to the longitudinal edges thereof; and Figure 5 is a sectional detail showing the means whereby the ring delineated in Figure 4 may be expanded.

In the drawings, there is shown a wheel body including a felly 1 carrying a rim 2 having a fixed side 3 and provided with a removable side 4, the removable side being held in place, as is customary, by clips 5 attached by bolts 6 to the felly 1.

A casing 7 is supported on the rim 2, the beads of the casing bearing against the side members 3 and 4 of the rim 2.

Located within the casing 7 is a transversely expansible frame or inner tube, having free longitudinal edges 38. The frame or tube may be made in any desired manner, and I do not limit myself to any specific construction, in this regard. If desired, the expansible frame or inner tube may comprise arched spring strips 8, rings 9 being secured as indicated at 10 to the strips 8. The rings 9, and consequently the frame 8 or inner tube may be made in sections, the sections of the rings 9 being denoted by the numeral 11. In one end of each section 11 there is fashioned a smooth recess 12 there being a threaded recess 14 in the other end of each section. The numeral 15 denotes a screw threaded into the recess 14 of one section, the screw having a smooth end 16 rotatable in the recess 12 of an adjoining section, the screw being supplied with a polygonal shoulder 17, adapted to abut against that end of the section 11 which is provided with the smooth recess 12. It will be clear that when rotation is imparted to the screw 15 through the instrumentality of a wrench, applied to the shoulder, 17, the sections 11 will be separated circumferentially of the tire. This construction adapts the device to a casing which may be old, stretched or over-sized. The parts 8 preferably are made of metal, and, if desired, a lining 58 may be interposed between the members 8 and the casing 7, to the end that the casing may not be worn, rusted corroded or otherwise injured by direct contact with the metal parts 8.

Transverse screws 18 are provided, the ends of each screw being oppositely threaded into the rings 9 at the respective sides of the tire. Each screw 18 carries a sprocket wheel 19. A housing 20 is mounted on one screw 18, and the sprocket wheel 19 of the screw operates partially within the housing, as will be understood readily when Figures 1 and 2 are compared. The numeral 21 denotes, generally, a shaft, comprising a section 22 and a section 23 connected by a pivot element 24, so that the section 22 may be swung laterally with respect to the section 23 for convenience in packing, shipment and storage. The section 23 of the shaft 21 is journaled in the inner end of the housing 20 and is provided with a head 25, there being curved ribs on the end of the head 25 as Figure 3 will most clearly show. The ribs 26 are curved on an arc which is not concentric with the axis of rotation of the shaft 21. The ribs 26 are adapted to coact, one at a time, with the teeth of the sprocket wheel 19 which extends into the housing 20. A sprocket chain 27 is passed around all of the sprocket wheels 19. The shaft 21 may be journaled in a tubular bearing 28 located in the felly 1 and, if desired, threaded into the rim 2. The outer end of the shaft 21 may be squared as shown at 29, or otherwise constructed, so as to receive a wrench or key. The end 29 of the shaft 21 is housed within a cap 30 threaded or otherwise secured on the end of the tubular bearing 28 and engaged with the felly 1.

In practical operation, rotation may be imparted to the shaft 21, by means of a wrench or key (not shown) applied to the end 29 of the shaft. When the shaft 21 is rotated, the ribs 26, one after another, will engage with the sprocket wheel 19 which is located partially within the housing 20. When the said sprocket wheel is rotated, motion will be transmitted to all of the sprocket wheels, because the device includes the sprocket chain 27. Rotation, therefore, will be imparted simultaneously to all of the screws 18, and since the screws are threaded at their ends, in opposite directions, into the rings 9, the frame or inner tube can be expanded or contracted at the will of an operator.

Having thus described the invention, what is claimed is:—

1. In a device of the class described, a wheel body; a casing on the wheel body; a transversely expansible frame in the casing and having free longitudinal edges; transverse screws each oppositely threaded at its ends into the frame adjacent to the free longitudinal edges of the frame; sprocket wheels on the screws; a sprocket chain engaging the sprocket wheels; and a shaft journaled in the wheel body, the shaft being provided on its end with ribs engaging one sprocket wheel and curved eccentrically with respect to the axis of rotation of the shaft.

2. A device of the class described constructed as set forth in claim 1, and further characterized by a housing wherein both the shaft and the screw which carries the last specified sprocket wheel are journaled.

In testimony that I claim the foregoing as my own, I have hereto affixed my signature in the presence of two witnesses.

FRANK E. BESSLER.

Witnesses:
M. F. HAMMAR,
GRACE TRITT.